United States Patent
Menendez

(10) Patent No.: US 9,092,380 B1
(45) Date of Patent: Jul. 28, 2015

(54) SYSTEM AND METHOD OF COMMUNICATIONS WITH SUPERVISED INTERACTION

(76) Inventor: Norberto Menendez, Miami, FL (US)

(*) Notice: Subject to any disclaimer, the term of this patent is extended or adjusted under 35 U.S.C. 154(b) by 1975 days.

(21) Appl. No.: 11/870,877

(22) Filed: Oct. 11, 2007

(51) Int. Cl.
| | |
|---|---|
| G06F 15/16 | (2006.01) |
| G06F 7/04 | (2006.01) |
| H04L 29/06 | (2006.01) |
| H04L 12/26 | (2006.01) |
| G06F 15/173 | (2006.01) |
| H04L 29/08 | (2006.01) |

(52) U.S. Cl.
CPC .............. *G06F 15/16* (2013.01); *G06F 15/173* (2013.01); *H04L 29/06* (2013.01); *H04L 43/00* (2013.01); *H04L 63/102* (2013.01); *H04L 67/14* (2013.01); *H04L 69/329* (2013.01)

(58) Field of Classification Search
CPC .............. G06Q 10/10; H04L 65/1059; H04N 21/6587; H04W 12/02
USPC ............................ 705/1; 726/3; 709/224, 218
See application file for complete search history.

(56) References Cited

U.S. PATENT DOCUMENTS

| | | | | | |
|---|---|---|---|---|---|
| 4,815,070 | A | * | 3/1989 | Hoshi | 370/396 |
| 5,546,584 | A | * | 8/1996 | Lundin et al. | 719/315 |
| 5,987,117 | A | * | 11/1999 | McNeil et al. | 379/265.1 |
| 6,016,426 | A | * | 1/2000 | Bodell | 455/422.1 |
| 6,018,406 | A | * | 1/2000 | Ishimatsu et al. | 398/181 |
| 6,018,516 | A | * | 1/2000 | Packer | 370/231 |
| 6,038,216 | A | * | 3/2000 | Packer | 370/231 |
| 6,040,770 | A | * | 3/2000 | Britton | 340/539.24 |
| 6,087,933 | A | * | 7/2000 | Addy et al. | 340/539.24 |
| 6,122,358 | A | * | 9/2000 | Shoji et al. | 379/265.11 |
| 6,151,390 | A | * | 11/2000 | Volftsun et al. | 379/229 |
| 6,255,945 | B1 | * | 7/2001 | Britton | 340/539.24 |
| 6,269,399 | B1 | * | 7/2001 | Dyson et al. | 709/224 |
| 6,542,588 | B1 | * | 4/2003 | Mashinsky | 379/114.02 |
| 6,801,937 | B1 | * | 10/2004 | Novaes et al. | 709/220 |
| 6,831,915 | B1 | * | 12/2004 | Beyschlag et al. | 370/352 |
| 6,856,676 | B1 | * | 2/2005 | Pirot et al. | 379/201.01 |
| 6,909,708 | B1 | * | 6/2005 | Krishnaswamy et al. | 370/352 |
| 6,947,989 | B2 | * | 9/2005 | Gullotta et al. | 709/226 |
| 6,999,589 | B2 | * | 2/2006 | Cato et al. | 380/270 |
| 7,020,701 | B1 | * | 3/2006 | Gelvin et al. | 709/224 |
| 7,096,003 | B2 | * | 8/2006 | Joao et al. | 455/406 |
| 7,133,834 | B1 | * | 11/2006 | Abelow | 705/10 |
| 7,317,699 | B2 | * | 1/2008 | Godfrey et al. | 370/328 |
| 7,363,495 | B2 | * | 4/2008 | Felt et al. | 713/170 |
| 7,366,790 | B1 | * | 4/2008 | Rustad et al. | 709/235 |
| 7,412,517 | B2 | * | 8/2008 | Jorgensen | 709/226 |
| 7,496,674 | B2 | * | 2/2009 | Jorgensen | 709/230 |
| 7,530,113 | B2 | * | 5/2009 | Braun | 726/28 |

(Continued)

*Primary Examiner* — Krista Zele
*Assistant Examiner* — Margishi Desai
(74) *Attorney, Agent, or Firm* — Jesus Sanchelima, Esq; Christian Sanchelima, Esq.

(57) ABSTRACT

A system for communicating and exchanging information between two or more parties, and method to accomplish same. The system and method includes a controlling third party. The system includes the use of a global computer network to which said parties are connected and a server. One of the parties can be a coordinator with control over software run by the server that controls and limits the nature and frequency of the communication and exchange of information between or among the parties. Parties can "connect" to the system via any one or more of the following: cell phones, telephones, computers, personal digital assistants, iPhones, audio devices such as mp3 players and/or iPods, etc.

6 Claims, 2 Drawing Sheets

(56) References Cited

U.S. PATENT DOCUMENTS

| | | | |
|---|---|---|---|
| 7,533,418 B1* | 5/2009 | Yoakum et al. | 726/26 |
| 7,536,449 B2* | 5/2009 | Melo et al. | 709/220 |
| 7,913,176 B1* | 3/2011 | Blattner et al. | 715/758 |
| 7,958,237 B2* | 6/2011 | Fertell et al. | 709/225 |
| 8,073,855 B2* | 12/2011 | Nagoya | 707/754 |
| 2001/0056462 A1* | 12/2001 | Kataoka | 709/203 |
| 2002/0031230 A1* | 3/2002 | Sweet et al. | 380/278 |
| 2002/0064149 A1* | 5/2002 | Elliott et al. | 370/352 |
| 2002/0101967 A1* | 8/2002 | Eng et al. | 379/114.01 |
| 2002/0156904 A1* | 10/2002 | Gullotta et al. | 709/229 |
| 2002/0178270 A1* | 11/2002 | Riordan | 709/229 |
| 2003/0028491 A1* | 2/2003 | Cooper | 705/64 |
| 2003/0162499 A1* | 8/2003 | Jonsson | 455/41 |
| 2004/0008635 A1* | 1/2004 | Nelson et al. | 370/260 |
| 2004/0083281 A1* | 4/2004 | Makagon et al. | 709/223 |
| 2004/0133440 A1* | 7/2004 | Carolan et al. | 705/1 |
| 2005/0091674 A1* | 4/2005 | Knight et al. | 719/332 |
| 2005/0114514 A1* | 5/2005 | Bostrom et al. | 709/227 |
| 2006/0190547 A1* | 8/2006 | Bhogal et al. | 709/207 |
| 2006/0212583 A1* | 9/2006 | Beadle et al. | 709/227 |
| 2006/0229974 A1* | 10/2006 | Keithley et al. | 705/38 |
| 2007/0017974 A1* | 1/2007 | Joao | 235/380 |
| 2007/0043632 A1* | 2/2007 | Abelow | 705/27 |
| 2007/0067451 A1* | 3/2007 | Oshiba | 709/224 |
| 2007/0094374 A1* | 4/2007 | Karia et al. | 709/223 |
| 2007/0118389 A1* | 5/2007 | Shipon | 705/1 |
| 2007/0124690 A1* | 5/2007 | Lu | 715/752 |
| 2007/0157307 A1* | 7/2007 | Katoh et al. | 726/14 |
| 2007/0162301 A1* | 7/2007 | Sussman et al. | 705/1 |
| 2007/0169196 A1* | 7/2007 | Dapp | 726/23 |
| 2007/0219817 A1* | 9/2007 | Wu | 705/1 |
| 2007/0245026 A1* | 10/2007 | Martin et al. | 709/227 |
| 2008/0064381 A1* | 3/2008 | Ackley | 455/417 |
| 2008/0071900 A1* | 3/2008 | Hecker et al. | 709/223 |
| 2008/0071917 A1* | 3/2008 | Petrovykh | 709/230 |
| 2008/0120190 A1* | 5/2008 | Joao et al. | 705/16 |
| 2008/0172746 A1* | 7/2008 | Lotter et al. | 726/26 |
| 2008/0222533 A1* | 9/2008 | Hankejh et al. | 715/738 |
| 2008/0235746 A1* | 9/2008 | Peters et al. | 725/111 |
| 2008/0301703 A1* | 12/2008 | Nixon et al. | 719/312 |
| 2009/0106673 A1* | 4/2009 | Jung et al. | 715/757 |
| 2010/0145737 A1* | 6/2010 | Joao | 705/4 |
| 2011/0209198 A1* | 8/2011 | Blattner et al. | 726/3 |

* cited by examiner

SYSTEM AND METHOD OF COMMUNICATIONS WITH SUPERVISED INTERACTION

BACKGROUND OF THE INVENTION

1. Field of the Invention

The present invention relates to a system and method of communications with supervised interaction, and more particularly, to such a system and method that control the nature of the communication between at least two entities.

2. Description of the Related Art

Many systems for communicating and exchanging information have been designed in the past. None of them, however, includes a system and method where the communicating parties may be supervised by a third party, such as a coordinator.

None of them include the use of controlled specific choices (either through the use of visual and/or auditory user interface such as menus and/or prompts) that control the scope of the communication. The third party (also referred to as the enabler or coordinator) controls the scope of the communication.

SUMMARY OF THE INVENTION

It is one of the main objects of the present invention to provide a system and method for controlling and supervising the scope of communication and exchange of information between at least two parties.

It is another object of this invention to provide a system and method that make the parties aware of their respective responsibilities relating to the subject matter that relates them with the limitations incorporated by the third party.

It is still another object of the present invention to provide a system and method that enables the parties to exchange controlled information in one or more languages.

It is another object of this invention to provide a system and method of communication that ensures that the parties are focused on the issues of communicating and cannot deviate from controlled subjects.

It is yet another object of this invention to provide such a system and method that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
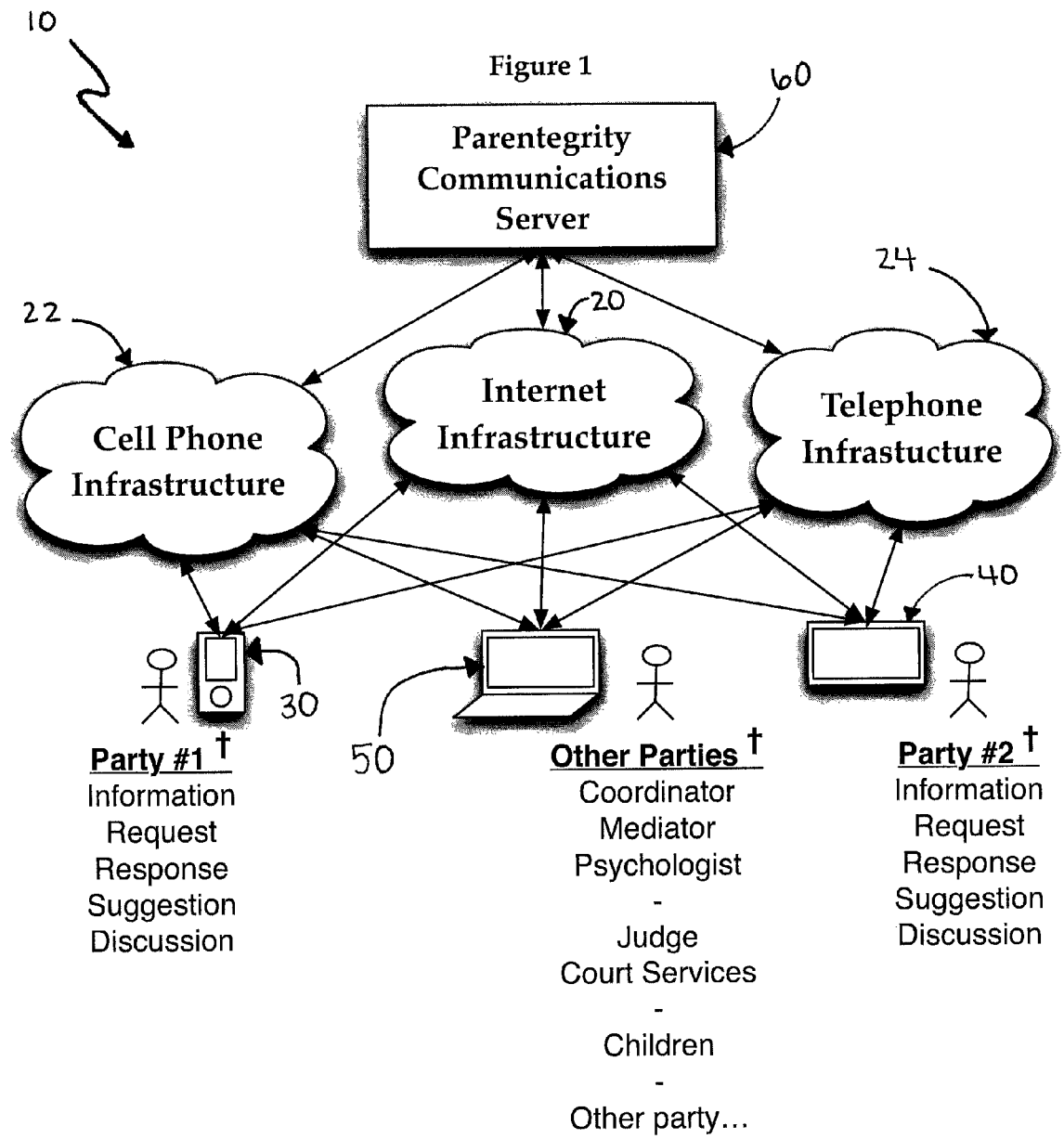
FIG. 1 is a representation of the system using three interconnected network infrastructures with work stations connected thereto.

Referring now to the drawings, and specifically to FIG. 1, where the present invention is generally referred to with numeral 10, it can be observed that it basically includes global computer network 20, cellular network 22, land telephone network 24, and other interconnected networks (not shown) with equivalent compatibilities, computerized networkable entities or stations 30 and 40 (more than two are also possible and to simplify this explanation only two entities or stations will be used in this embodiment), third party station 50, and computer server 60 including software and storage assemblies. Computer server 60 includes software that is selectively programmable by station 50 only, in order to control the scope of the communication, as well as the frequency, hours, etc.

The software residing in computer server 60 includes data and instructions that are selectively programmable and controlled through third party station 50. In FIG. 1, station 50 is shown to access computer server 60 via networks 20; 22; or 24 but station 50 could also access server 60 directly. The software includes a predetermined number of categories and sub-categories that can be changed through station 50. In practice, station 50 is accessible by a judge, mediator, psychologist, child guardian, or a similar figure with vested responsibilities in the relationship between or among the parties. The parties could be spouses, ex-spouses, partners, grandparents, or any other parties linked by a relationship that requires the exchange of information to accept and/or discharge pre-established duties.

The categories and sub-categories available to the communicating parties are determined by the third party. The categories go from general to specific to control the scope of the communications permitted between the parties. As the requesting communicating party navigates and searches for the available choices (i.e. request child for grandparent's birthday party, etc.), other helpful information can also be selectively supplied (advice by third party for particular categories, statistics on the number of requests previously made, or how the requester is doing with respect to other references, etc.). This additional information helps the requester evaluate the reasonableness of the request prior to dispatching it to system 10.

Figure 2:
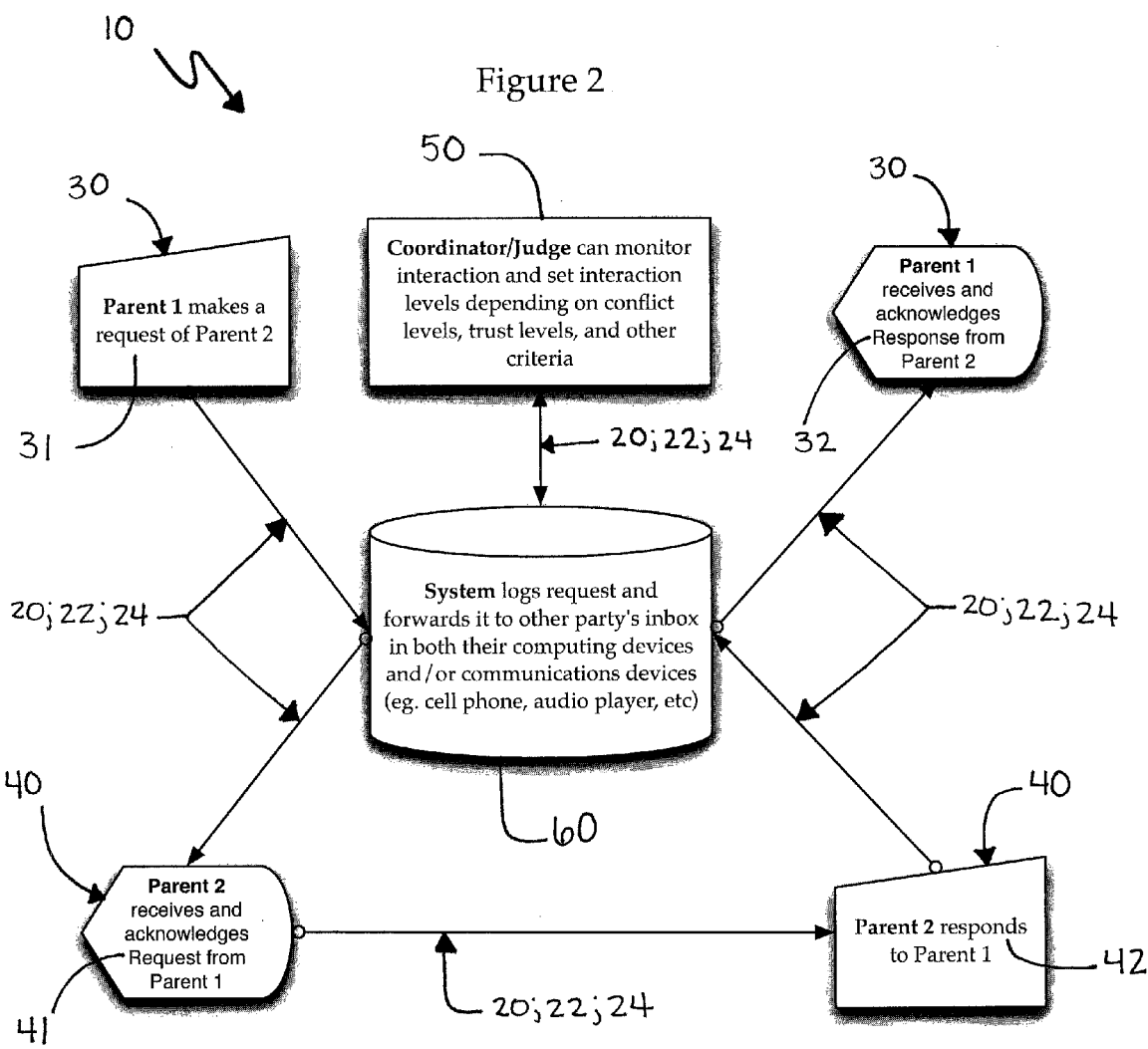
FIG. 2 is a chart with the steps followed by one of the preferred embodiments of the present method.

As shown in FIG. 2, once requesting party (station 30) dispatches request 31 to system 10, the latter logs it in, with the computer server 60 maintaining a database with the time, date, originating party, and other information that may be required by the selected category/sub-category selected by the requesting party (station 30). Optimally, system 10 provides the requesting party (station 30) with a tracking number or other identifier for potential subsequent follow-up.

The communicating parties (stations 30;40) also have limited online access to system 10 to view their own profiles, statistics, and communication with the third party (under limited circumstances). The levels of interaction and categories are set by third party (station 50).

Once a request 31 has been accepted by system 10, the target communicating party (station 40) is notified, and again, the date, time, category/sub-category, and any other relevant information is logged by system 10. System 10 may escalate the manner and media used for notifying the target communicating party (station 40) depending on the category/sub-category and/or other circumstances that the third party (station 50) deems advisable. The different preferred media for communicating between the parties are listed on the parties' profile and may also by a prerequisite for using system 10. For example, the third party (station 50) may require at least one means for communicating through the internet 20, telephone 22;24, etc. System 10 can use more than one communication media depending on the responsiveness of the target party (station 40) and/or the immediacy of the request 31.

Having been notified that there is a request 31 in the queue, the target party (station 40) is required to acknowledge receipt 41 of the request, optionally, prior to providing an answer 42. Time limits can be optionally set, and extended by the third party (station 50) only, to acknowledge receipt 41 and/or provide an answer 42, or assume that the request 31 has been accepted if there is no response. System 10 is more efficient when the third party (station 50) has a position of authority, stipulated to or by operation of law.

The responses and options that are available to the target communicating party (station 40) are also limited. The third party (station 50) can optionally include additional information to the target communicating party to help him/her evaluate the request 31 and possible consequences of the different options for the answer 42 available at this point.

Once target communicating party (station 40) issues answer 42, system 10 logs the answer and relevant information in a database, places the said answer a queue, and notifies requesting party (station 30). The requesting party (station 30) is required to acknowledge receipt 32 of answer 42. Time limits can be optionally set, and extended by the third party (station 50) only, to acknowledge receipt of answer 42 and/or set options for responses.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. The system for communicating and exchanging information under control, comprising:
   A) global computer network;
   B) at least two communicating parties' computer station means for connecting to each other only through said network;
   C) a computerized server connected to said network; wherein said server includes software for limiting the communication and limiting the information exchanged between said at least two computer station means; and
   wherein said software further saves historical events over a predetermined period of time including the dates and times said communications and exchanges of information took place and said software further provides (1) restricted predetermined information categories and sub-categories for requests to be initiated by one of said at least two communicating parties; and (2) restricted predetermined options to answer by another of said at least two communicating parties; and
   D) third party station means for connecting to said network and accessing and controlling said software, so that said at least two communicating parties' computer station means communicate with each other with limitations set by said predetermined categories and sub-categories and additional limitations selectively introduced by said third party station means and said software based on said saved historical events and said predetermined categories and sub-categories.

2. The systems set forth in claim 1 wherein said software provides a predetermined number of messages that are delivered to one or more of said at least two communicating parties' computer station means upon the occurrence, or failure to occur, of at least one of said historical events over a predetermined period of time.

3. The system set forth in claim 2 wherein said software provides a predetermined number of communication options available to each of said at least two computer station means.

4. The systems set forth in claim 3 wherein said communication options are made available by said software over predetermined periods of time.

5. The system set forth in claim 4 further including output means for generating reports of the saved historical events.

6. The system set forth in claim 1 wherein each of said at least two communicating parties includes at least one individual.

* * * * *